United States Patent
Kim et al.

(10) Patent No.: US 9,187,622 B2
(45) Date of Patent: Nov. 17, 2015

(54) COMPOSITE BINDER FOR BATTERY, AND ANODE AND BATTERY INCLUDING THE COMPOSITE BINDER

(71) Applicant: Samsung SDI Co., Ltd., Yongin-si (KR)

(72) Inventors: Myoung-Sun Kim, Yongin-si (KR); Jun-Kyu Cha, Yongin-si (KR); Na-Ri Seo, Yongin-si (KR); Young-Su Kim, Yongin-si (KR); Ki-Jun Kim, Yongin-si (KR); Kwi-Seok Choi, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 84 days.

(21) Appl. No.: 13/742,930

(22) Filed: Jan. 16, 2013

(65) Prior Publication Data

US 2013/0209882 A1    Aug. 15, 2013

(30) Foreign Application Priority Data

Feb. 9, 2012   (KR) .................. 10-2012-0013328
Jan. 14, 2013   (KR) .................. 10-2013-0004036

(51) Int. Cl.
*C08K 5/54* (2006.01)
*H01M 4/62* (2006.01)

(52) U.S. Cl.
CPC ............. *C08K 5/5406* (2013.01); *H01M 4/621* (2013.01); *H01M 4/622* (2013.01); *H01M 4/623* (2013.01)

(58) Field of Classification Search
None
See application file for complete search history.

(56) References Cited

U.S. PATENT DOCUMENTS

| | | | |
|---|---|---|---|
| 2003/0113625 A1 | 6/2003 | Kim et al. | |
| 2005/0191550 A1 | 9/2005 | Satoh et al. | |
| 2007/0264570 A1* | 11/2007 | Oh et al. | 429/217 |
| 2008/0118836 A1* | 5/2008 | Hwang et al. | 429/219 |
| 2009/0325069 A1* | 12/2009 | Anada et al. | 429/217 |
| 2010/0285341 A1* | 11/2010 | Yun et al. | 429/94 |
| 2010/0290044 A1* | 11/2010 | Lee et al. | 356/326 |

FOREIGN PATENT DOCUMENTS

| | | |
|---|---|---|
| JP | 2006-124660 A | 5/2006 |
| JP | 2011-049046 A | 3/2011 |
| JP | 2011-134584 A | 7/2011 |
| JP | 2011-153237 A | 8/2011 |
| WO | WO 2004/107481 A1 | 12/2004 |
| WO | WO 2007/029934 A1 | 3/2007 |
| WO | WO 2007/129841 A1 | 11/2007 |
| WO | WO 2008/010667 A1 | 1/2008 |
| WO | WO 2010/030955 A1 | 3/2010 |

OTHER PUBLICATIONS http://www.misumi-techcentral.com/tt/en/mold/2011/12/106-glass-transition-temperature-tg-of-plastics.html.*
http://www.gelest.com/goods/pdf/faq/question%2012.pdf.*
http://materialsworld.utep.edu/Background/Inorganic%20Chemistry/PDF%20files/Amorphous%20Metal.pdf.*
Aurbach et al., "Behavior of lithiated graphite electrodes comprising silica based binder," *J. Appl. Electrochem.*, (1998), 28: 1051-1059.
Xu et al., "Surface-modified silicon nanowire anodes for lithium-ion batteries," *J. Power Sources* (2011), doi:10.1016/j.jpowsour.2011.05.059.
Extended European Search Report dated May 29, 2013 for European Patent Application No. EP 13 154 641.8 which shares priority of Korean Patent Application Nos. KR 10-2012-0013328, filed Feb. 9, 2012 and KR 10-2013-0004036, filed Jan. 14, 2013, with captioned U.S. Appl. No. 13/742,930.

* cited by examiner

*Primary Examiner* — Patrick Ryan
*Assistant Examiner* — Christopher Domone
(74) *Attorney, Agent, or Firm* — Knobbe Martens Olson & Bear LLP

(57) ABSTRACT

In one aspect, a composite binder for a battery, including an inorganic particle; a binder polymer; and an organic-inorganic coupling agent, a negative electrode including the composite binder, and a lithium battery including the negative electrode is provided.

18 Claims, 2 Drawing Sheets

COMPOSITE BINDER FOR BATTERY, AND ANODE AND BATTERY INCLUDING THE COMPOSITE BINDER

CROSS-REFERENCE TO RELATED APPLICATIONS

This application claims the benefit of Korean Patent Application Nos. 10-2012-0013328, filed on Feb. 9, 2012 and 10-2013-0004036, filed on Jan. 14, 2013, in the Korean Intellectual Property Office, the disclosures of which are incorporated herein in their entirety by reference.

BACKGROUND

1. Field

One or more embodiments relate to a composite binder for a battery, and an anode and a battery including the same.

2. Description of the Related Technology

Lithium batteries have high voltage and high energy density and thus, are used in various applications. For example, electric vehicles (hybrid electric vehicle (HEV) or plug-in hybrid electric vehicle (PHEV)) need to operate at high temperature, need to be charged or discharged with a large amount of electricity, and are used for a long period of time. Accordingly, they require lithium batteries having excellent discharge capacity and lifespan characteristics.

Carbonaceous materials have a porous structure and thus, during charging and discharging, they undergo less volumetric change. However, due to the porous structure of carbon, a battery using such carbonaceous materials has a small capacitance. For example, certain graphite forms having high crystallinity may theoretically have a capacity of 372 mAh/g.

A metal that is alloyable with lithium may be used as a negative active material having higher electric capacitance than the carbonaceous materials. For example, a metal that is alloyable with lithium may be Si, Sn, Al, and the like. However, metal that is alloyable with lithium may easily deteriorate and thus its lifespan characteristics may be poor. For example, Sn particles may be repeatedly aggregated and crushed when charging and discharging are repeatedly performed and thus, Sn particles may be electrically insulated.

Accordingly, there is a need to develop a binder that improves lifespan characteristics of a lithium battery by accepting and/or suppressing a volumetric change of these non-carbonaceous negative active materials.

SUMMARY

One or more embodiments of the present disclosure include a composite binder for a battery, having improved tensile strength.

One or more embodiments of the present disclosure include a negative electrode including the composite binder.

One or more embodiments of the present disclosure include a lithium battery including the negative electrode. Some embodiments provide a composite binder comprising: an inorganic particle; a binder polymer; and an organic-inorganic coupling agent. Some embodiments provide a negative electrode comprising a negative active material and a composite binder. Some embodiments provide a lithium battery including a negative electrode and a positive electrode.

Additional aspects will be set forth in part in the description which follows and, in part, will be apparent from the description, or may be understood by practice of the presented embodiments.

According to one or more embodiments of the present disclosure, a composite binder includes: an inorganic particle; a binder polymer; and an organic-inorganic coupling agent.

According to one or more embodiments of the present disclosure, a negative electrode includes: a negative active material; and the composite binder described above.

According to one or more embodiments of the present disclosure, a lithium battery includes the negative electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
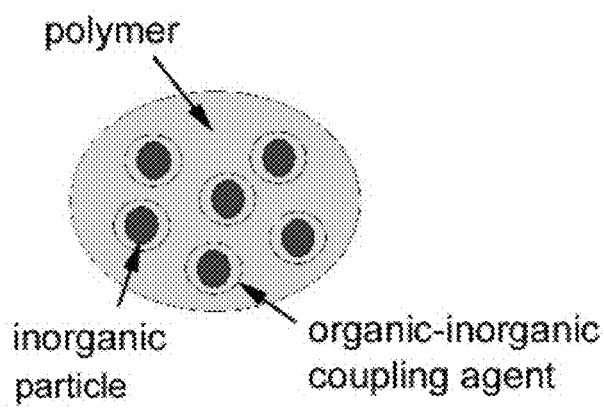
FIG. 1 is a schematic view of a composite binder according to one embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Hereinafter, composite binders for a battery, anodes including the composite binders, and lithium batteries including the negative electrodes according to embodiments of the present disclosure are described in detail below.

A composite binder for a battery according to an embodiment of the present disclosure may include an inorganic particle, a binder polymer, and an organic-inorganic coupling agent. In certain embodiments, the composite binder may include the inorganic particle and the binder polymer, and the organic-inorganic coupling agent may couple the inorganic particle and the binder polymer to provide high strength. In certain embodiments, such configuration allows during charging and discharging, a volumetric change of a negative active material may be accepted and/or suppressed and thus, cyclic characteristics of a lithium battery including the composite binder may be improved in comparison to a a lithium battery that does not include a composite binder.

In certain embodiments, the composite binder may be in the form of a binder solution including a solvent, before or during manufacturing a negative electrode. For example, a binder polymer particle may be dispersed in a solvent and an inorganic particle may be dispersed inside the binder polymer particle. In certain embodiments, the inorganic particle may be uniformly dispersed in the binder polymer particle, or dispersed mainly around the surface of the binder polymer particle depending on the type of binder polymer.

In certain embodiments, the solvent may be removed from the binder solution, and the inorganic particle may be present dispersed inside the binder polymer.

In certain embodiments, the organic-inorganic coupling agent may be disposed on at least a portion of the inorganic particle to couple the inorganic particle to the binder polymer. In certain embodiments, the organic-inorganic coupling agent may completely cover the inorganic particle, or may be present in an island shape on the surface of the inorganic particle. In certain embodiments, the composite binder may have an exemplary structure illustrated in FIG. 1 in the binder solution.

In certain embodiments, the inorganic particle may be a hydrophilic particle having a hydroxyl group on a surface thereof. In certain embodiments, the hydrophilic particle may have high reactivity with the binder polymer and the organic-inorganic coupling agent. Also, the inorganic particle may have an amorphous phase.

In certain embodiments, an average particle diameter of the inorganic particle may be in a range of about 1 nm to about 1000 nm. For example, an average particle diameter of the inorganic particle may be in a range of 1 nm to 100 nm. For example, an average particle diameter of the inorganic particle may be in a range of about 10 nm to about 100 nm. When the average particle size of the inorganic particle is too small, manufacturing may be hard, and when the average particle size of the inorganic particle is too great, hardness of the binder polymer may be low.

In certain embodiments, the inorganic particle may be at least one selected from metal oxides and metalloidal oxides. For example, the inorganic particle may be at least one selected from silica, alumina, titanium dioxide, magnesium fluoride, and zirconium oxide.

In certain embodiments, the inorganic particle may be used in a colloidal state. In certain embodiments, the colloidal-phase inorganic particle may have an acidic, neutral, or alkali property. For example, a pH of the colloidal-phase inorganic particle may be in a range of about 8 to about 11. When the pH is too low, the colloidal-phase inorganic particle may aggregate or gelate, and when the pH is too high, storage stability may be decreased.

In certain embodiments, the organic-inorganic coupling agent may be a silane-based compound. In certain embodiments, the organic-inorganic coupling agent may be a hydrolysis product of a silane-based compound. In certain embodiments, the organic-inorganic coupling agent may be an organic silicon compound having a hydrolyzable functional group. In certain embodiments, the hydrolyzable functional group may be a functional group that binds to an inorganic particle, such as silica, after hydrolysis. For example, the organic-inorganic coupling agent may include at least one moiety selected from the group consisting of an alkoxy group, a halogen group, an amino group, a vinyl group, a glycidoxy group, and a hydroxyl group.

In certain embodiments, the organic-inorganic coupling agent may be at least one component selected from the group consisting of vinylalkylalkoxysilane, epoxyalkylalkoxysilane, mercaptoalkylalkoxysilane, vinylhalosilane, and alkylacyloxysilane.

In certain embodiments, the organic-inorganic coupling agent may be one selected from vinyltris(β-methoxyethoxy)silane, γ-metacryloxypropyltrimethoxysilane, γ-glycidoxypropyltrimethoxysilane, β-(3,4-epoxycyclohexyl)ethyltrimethoxysilane, γ-glycidoxypropylmethyldiethoxysilane, γ-aminopropyltriethoxysilane, γ-mercaptopropyltrimethoxysilane, γ-chloropropyltrimethoxysilane, vinyltrichlorosilane, and methyltriacetoxysilane, but is not limited thereto. In certain embodiments, the organic-inorganic coupling agent may be any one of various silane coupling agents used in the art.

In certain embodiments, the binder polymer may be any one of various polymers that have a polar functional group that forms a hydrogen bond with the inorganic particle. In certain embodiments, the polar functional group may be a carboxyl group, a hydroxyl group, or the like.

In certain embodiments, a glass transition temperature of the binder polymer may be in a range of about −50° C. to about 60° C. In certain embodiments, the glass transition temperature of the binder polymer may be in a range of about −40° C. to about 20° C. In certain embodiments, the binder polymer may have an appropriate level of hardness when the glass transition temperature of the binder polymer is a temperature in a range of about −50° C. to about 60° C.

In certain embodiments, the binder polymer may include at least one component selected from the group consisting of styrene-butadiene rubber, acrylated styrene-butadiene rubber, acrylonitrile-butadiene rubber, acrylonitrile-butadiene-styrene rubber, acryl rubber, butyl rubber, fluorinated rubber, polytetrafluoroethylene, polyethylene, polypropylene, an ethylenepropylene copolymer, a polyethyleneoxide, polyvinylpyrrolidone, polyepichlorohydrine, polyphosphazene, polyacrylate, polyacrylonitrile, polystyrene, an ethylenepropylenediene copolymer, polyvinylpyridine, chlorosulfonated polyethylene, latex, a polyester resin, an acryl resin, a phenol resin, an epoxy resin, polyvinylalchohol, carboxymethyl cellulose, hydroxypropylmethyl cellulose, hydroxy propylcellulose, and diacetyl cellulose, but is not limited thereto. For example, any one of various materials that are used as an aqueous binder in the art may be used.

In certain embodiments, a monomer that may be used in preparing the binder polymer may be, for example, an ethylenically unsaturated carboxlyic acid alkylester, such as methyl methacrylatic acid, butyl methacrylatic acid, ethyl methacrylatic acid, and methacrylatic acid-2-ethylhexyl; a cyano group-containing ethylenically unsaturated monomer, such as acrylonitrile, methacrylonitride, α-chloroacrylonitrile, and α-cyanoethyl acrylonitrile; a conjugated diene monomer, such as 1,3-butadiene, isoprene, 2,3-dimethyl-1,3-butadiene, 2-ethyl-1,3-butadiene, 1,3-pentadiene, and chloroprene; an ethylenically unsaturated carbonic acid, such as an acrylic acid, a methacrylic acid, a maleic acid, a fumaric acid, and a cytraconic acid, and a salt thereof; an aroamtic vinyl monomer, such as styrene, alkylstyrene, and vinylnaphthalene; a fluoroalkylvinylether, such as fluoroethylvinylether; a non-conjugated diene monomer, such as vinylpyridine, vinylnorbonene, dicyclopentdiene, and 1,4-hexadiene; an α-olefine, such as ethylene and propylene; and an ethylenically unsaturated amide monomer, such as metaacrylamide; but is not limited thereto. For example, any one of various materials that are used as a monomer in the art may be used.

In certain embodiments, the binder polymer may be formed by using various methods, such as emulsion polymerization or solution polymerization. However, other methods may also be used to form the binder polymer. Also, reaction conditions for such methods may also be appropriately regulated by one of ordinary skill in the art.

In certain embodiments, the binder polymer may have various phases. For example, the binder polymer may be used in an emulsion phase. In certain embodiments, a particle diameter of a polymer particle dispersed in the emulsion may be in a range of about 0.05 to about 1 μm. In certain embodiments, a particle diameter of a polymer particle may be in a range of about 0.05 to about 0.5 μm. In certain embodiments, a particle diameter of a polymer particle may be in a range of about 0.05 to about 0.2 μm. When the particle size of the polymer particle dispersed in the emulsion is too small, viscosity of the emulsion may be too high and thus handling thereof may be hard. On the other hand, when the particle diameter of the polymer particle is too great, initial adhesion force may be reduced.

In certain embodiments, the emulsion may have a pH of about 7 to about 11 to maintain its stability. As a pH controller, for example, ammonia, a hydroxide of an alkali metal, and the like may be used.

Regarding amounts of the binder polymer, the inorganic particle, and the organic-inorganic binder in the composite binder, based on 100 parts by weigh of the binder polymer, an amount of the inorganic particle may be in a range of about 1 to about 30 parts by weight and an amount of the organic-inorganic binder may be in a range of about 0.01 to about 5 parts by weigh. In certain embodiments, based on 100 parts by weigh of the binder polymer, an amount of the inorganic particle may be in a range of about 3 to about 15 parts by weight and an amount of the organic-inorganic binder may be in a range of about 0.01 to about 5 parts by weight.

In certain embodiments, a negative electrode may include a negative active material and the composite binder for a battery. In certain embodiments, a negative active material composition including a negative active material and the composite binder for a battery may be molded in a predetermined shape, or the negative active material composition may be coated on a current collector, such as a copper foil.

In certain embodiments, a mixture of a negative active material, a conductive agent, the composite binder, and a solvent may be prepared as a negative active material composition. In certain embodiments, the negative active material composition may be directly coated on a metal current collector to complete the manufacture of a negative electrode plate. In certain embodiments, the negative active material composition may be cast on a separate support and then a film separated from the support may be laminated on a metal current collector, thereby completing the manufacture of a negative electrode plate. In certain embodiments, the negative electrode may also be formed by using other methods.

In certain embodiments, the negative active material may be a non-carbonaceous material. In certain embodiments, the negative active material may include at least one component selected from the group consisting of a metal that is alloyable with lithium, an alloy of a metal that is alloyable with lithium, and an oxide of a metal that is alloyable with lithium. In certain embodiments, the negative active material may include a transition metal oxide and a non-transition metal oxide.

In certain embodiments, the metal that is alloyable with lithium may be Si, Sn, Al, Ge, Pb, Bi, Sb, Si—Y alloy (the Y is an alkali metal, an alkali earth metal, a Group 13 element, a Group 14 element, a transition metal, a rare-earth element, or a combination thereof element and is not Si), Sn—Y alloy (the Y may be an alkali metal, an alkali earth metal, a Group 13 element, a Group 14 element, a transition metal, a rare-earth element, or a combination thereof element and is not Sn), and the like. In certain embodiments, the element Y may be Mg, Ca, Sr, Ba, Ra, Sc, Y, Ti, Zr, Hf, Rf, V, Nb, Ta, Cr, Mo, W, Tc, Re, Fe, Pb, Ru, Os, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

In certain embodiments, the transition metal oxide may be titanium oxide, a vanadium oxide, or a lithium vanadium oxide.

In certain embodiments, the non-transition metal oxide may be $SnO_2$, $SiO_x (0<x<2)$, or the like.

In certain embodiments, the negative active material may be at least one component selected from the group consisting of Si, Sn, Pb, Ge, Al, $SiO_x$ ($0<x\leq2$), $SnO_Y$ ($0<y\leq2$), $Li_4Ti_5O_{12}$, $TiO_2$, $LiTiO_3$, and $Li_2Ti_3O_7$. In certain embodiments, the negative active material may be any one of various materials that are used as a non-carbonaceous negative active material in the art may be used herein.

In certain embodiments, a composite of the non-carbonaceous negative active material and a carbonaceous material may be used. In certain embodiments, a carbonaceous material may be included in addition to the non-carbonaceous material.

In certain embodiments, the carbonaceous material may be a crystalline carbon, an amorphous carbon, or a mixture thereof. In certain embodiments, the crystalline carbon may be natural or artificial graphite that is amorphous, tabular, flake, spherical, or fibrous, and the amorphous carbon may be soft carbon (cold calcined carbon) or hard carbon, mesophase pitch carbide, calcinded corks, and the like. In certain embodiments, an acetylene black, ketjen black, natural graphite, artificial graphite, carbon black, acetylene black, carbon fiber, or powder or fiber of copper, nickel, aluminum, or silver may be used as the conductive agent. In certain embodiments, one or more conductive materials, such as a polyphenylene derivative, may be mixed for use as the conductive agent. However, the conductive agent is not limited thereto, and any one of various materials that are used as a conductive agent in the art may be used herein. In certain embodiments, the crystalline carbonaceous material may be additionally used as the conductive agent.

In certain embodiments, a typical binder may be further used in addition to the composite binder. In certain embodiments, the typical binder may be one ore more components selected from the group consisting of a vinylidene fluoride/hexafluoropropylene copolymer, polyvinylidenefluoride (PVDF), polyacrylonitrile, polymethylmetacrylate, polytetrafluoroethylene, a mixture thereof, and a styrene butadiene rubber-based polymer. In certain embodiments, the typical binder may be any one of various materials that are used as a binder in the art may be used herein.

In certain embodiments, N-methylpyrrolidone (NMP), acetone, or water may be used as the solvent. In certain embodiments, any one of various materials that are used in the art may be used as the solvent.

In certain embodiments, the composite negative active material, the conductive agent, the binder, and the solvent may be present in amounts as included in a typical lithium battery. In certain embodiments, one or more of the conductive agent, the binder, and the solvent may not be included depending on the purpose and structure of the lithium battery.

A lithium battery according to an embodiment may include the negative electrode. An example of a method of manufacturing a lithium battery is described in detail hereafter.

In certain embodiments, a negative electrode may be prepared by using the method described above.

In certain embodiments, a positive active material, a conductive agent, a binder, and a solvent are mixed to prepare a negative active material. In certain embodiments, the positive active material composition may be directly coated and dried on a metal current collector to complete the manufacture of a positive electrode plate. In certain embodiments, the positive active material composition may be cast on a separate support and then a film separated from the support is laminated on a metal current collector, thereby completing the manufacture of a positive electrode plate.

In certain embodiments, at least one component selected from the group consisting of a lithium cobalt oxide, a lithium nickel cobalt, manganese oxide, a lithium nickel cobalt aluminum oxide, a lithium iron phosphate oxide, and lithium manganese oxide may be included as the positive active material. However, the positive active material is not limited thereto. In certain embodiments any one of various materials that are used as a positive active material in the art may be used.

In certain embodiments, the positive active material may be a compound represented by any one of $Li_aA_{1-b}B_bD_2$ (wherein, $0.90 \leq a \leq 1.8$, and $0 \leq b \leq 0.5$);
$Li_aE_{1-b}B_bO_{2-c}D_c$ (wherein, $0.90 \leq a \leq 1.8$, $0 \leq b \leq 0.5$, $0 \leq c \leq 0.05$);
$LiE_{2-b}B_bO_{4-c}D_c$ (wherein, $0 \leq b \leq 0.5$, and $0 \leq c \leq 0.05$);
$Li_aNi_{1-b-c}Co_bB_cD_\alpha$ (wherein, $0.90 \leq a \leq 1.8$, $0 \leq b \leq 0.5$, $0 \leq c \leq 0.05$, and $0 < \alpha \leq 2$);
$Li_aNi_{1-b-c}Co_bB_cO_{2-\alpha}L_\alpha$ (wherein, $0.90 \leq a \leq 1.8$, $0 \leq b \leq 0.5$, $0 \leq c \leq 0.05$, and $0 < \alpha < 2$);
$Li_aNi_{1-b-c}Co_bB_cO_{2-\alpha}L_2$ (wherein, $0.90 \leq a \leq 1.8$, $0 \leq b \leq 0.5$, $0 \leq c \leq 0.05$, and $0 < \alpha < 2$);
$Li_aNi_{1-b-c}Mn_bB_eD_\alpha$ (wherein, $0.90 \leq a \leq 1.8$, $0 \leq b \leq 0.5$, $0 \leq c \leq 0.05$, and $0 < \alpha \leq 2$);
$Li_aNi_{1-b-c}Mn_bB_cO_{2-\alpha}L_\alpha$ (wherein, $0.90 \leq a \leq 1.8$, $0 \leq b \leq 0.5$, $0 \leq c \leq 0.05$, and $0 < \alpha < 2$);
$Li_aNi_{1-b-c}Mn_bB_cO_{2-\alpha}L_2$ (wherein, $0.90 \leq a \leq 1.8$, $0 \leq b \leq 0.5$, $0 \leq c \leq 0.05$, and $0 < \alpha < 2$);
$Li_aNi_bE_cG_dO_2$ (wherein, $0.90 \leq a \leq 1.8$, $0 \leq b \leq 0.9$, $0 \leq c \leq 0.5$, and $0.001 \leq d \leq 0.1$);
$Li_aNi_bCo_cMn_dGeO_2$ (wherein, $0.90 \leq a \leq 1.8$, $0 \leq b \leq 0.9$, $0 \leq c \leq 0.5$, and $0 \leq d \leq 0.5$, $0.001 \leq e \leq 0.1$);
$Li_aNiG_bO_2$ (wherein, $0.90 \leq a \leq 1.8$, $0.001 \leq b \leq 0.1$.);
$Li_aCoG_bO_2$ (wherein, $0.90 \leq a \leq 1.8$, $0.001 \leq b \leq 0.1$);
$Li_aMnG_bO_2$ (wherein, $0.90 \leq a \leq 1.8$, and $0.001 \leq b \leq 0.1$);
$Li_aMn_2G_bO_4$ (wherein, $0.90 \leq a \leq 1.8$, and $0.001 \leq b \leq 0.1$);
$QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$);
$Li_{(3-f)}Fe_2(PO_4)_3$ ($0 \leq f \leq 2$); and $LiFePO_4$.

In the formulae above, A is Ni, Co, Mn, or a combination thereof; B is Al, Ni, Co, Mn, Cr, Fe, Mg, Sr, V, rare-earth element, or a combination thereof; D is O (oxygen), F (fluorine), S (sulfur), P (phosphorus), or a combination thereof; E is Co, Mn, or a combination thereof; L is F (fluorine), S (sulfur), P (phosphorus), or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

In certain embodiments, these compounds may have a coating layer on their surfaces for use as the positive active material, or these compounds may be mixed with a compound having a coating layer for use as the positive active material. In certain embodiments, the coating layer may include an oxide of a coating element, a hydroxide of a coating element, an oxyhydroxide of a coating element, an oxycarbonate of a coating element, or a hydroxycarbonate of a coating element. In certain embodiments, the compounds that form the coating layer may be amorphous or crystalline. In certain embodiments, a coating element may be included in the coating layer. In certain embodiments, the coating element may be, Mg, Al, Co, K, Na, Ca, Si, Ti, V, Sn, Ge, Ga, B, As, Zr, or a mixture thereof. In certain embodiments, the coating layer may be formed by using any one of various coating methods that are performed using the compounds and the elements and do not affect properties of the positive active material (for example, spray coating, immersion, or the like). Coating methods are known to one of ordinary skill in the art and thus, are not described in detail herein.

In certain embodiments, the coating layer may include, $LiNiO_2$, $LiCoO_2$, $LiMn_xO_2$, (x=1, 2), $LiNi_{1-x}Mn_xO_2$ ($0<x<1$), $LiNi_{1-x-y}Co_xMn_yO_2$ ($0<x<0.5$, $0<y<0.5$), $LiFeO_2$, $V_2O_5$, $TiS$, or $MoS$.

In certain embodiments the conductive agent, the binder, and the solvent included in the positive active material composition may be the same as used in the negative active material composition. In certain embodiments, a plasticizer may be further included in the positive active material composition and/or the negative active material composition to form pores in an electrode plate.

In certain embodiments, the positive negative active material, the conductive agent, the binder, and the solvent may be present in amounts as included in a typical lithium battery. In certain embodiments, one or more of the conductive agent, the binder, and the solvent may not be used depending on the purpose and structure of the lithium battery.

Then, a separator which is to be inserted between the positive electrode and the negative electrode may be prepared. In certain embodiments, the separator may be formed of any one of various materials that are typically used in a lithium battery. In certain embodiments, a material for forming the separator may be a material that has low resistance to ion migration of an electrolyte and has excellent electrolytic solution retaining capability. In certain embodiments, the separator forming material may be selected from glass fiber, polyester, Teflon, polyethylene, polypropylene, polytetrafluoroethylene (PTFE), and a combination thereof, each of which may be in a non-woven fabric or woven fabric form. For example, for use in a lithium ion battery, a rollable separator formed of polypropylene may be used, and for use in a lithium ion polymer battery, a separator that has excellent organic electrolytic solution-retaining capability may be used. In certain embodiments, the separator may be prepared by using the following method.

In certain embodiments, a separator composition may be prepared by mixing a polymer resin, a filler, and a solvent. In certain embodiments, the separator composition may be directly coated or dried on an electrode to complete the formation of the separator. In certain embodiments, the separator composition may be cast on a separate support and then a film separated from the support may be laminated on an electrode, thereby completing the formation of the separator.

A polymer resin used in preparing the separator may not be particularly limited, and any material that is used for a binder of an electrode plate may be used. In certain embodiments, a vinylidene fluoride/hexafluoropropylene copolymer, polyvinylidenefluoride (PVDF), polyacrylonitrile, polymethylmetacrylate, or a mixture thereof may be used.

Then, an electrolyte may be prepared as the electrolyte.

In certain embodiments, the electrolyte may be an organic electrolytic solution. In certain embodiments, the electrolyte may be solid. In certain embodiments, the electrolyte may be a boron oxide, lithium oxynitride, and the like, but the solid electrolyte may not be limited thereto. In certain embodiments, any one of various materials that are used as a solid electrolyte in the art may be used herein. In certain embodiments, the solid electrolyte may be formed on the negative electrode by, for example, sputtering.

For example, an organic electrolytic solution may be prepared. In certain embodiments, the organic electrolytic solution may be prepared by dissolving a lithium salt in an organic solvent.

In certain embodiments, the organic solvent may be any one of various materials that are used as an organic solvent in the art. In certain embodiments, the organic solvent may be propylene carbonate, ethylenecarbonate, fluoroethylenecarbonate, butylene carbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, or a mixture thereof.

In certain embodiments, the lithium salt may be any one of various materials that are used as a lithium salt in the art. In certain embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(SO_2C_xF_{2x+1})(SO_2C_yF_{2y+1})$ (wherein x and y are natural numbers of 1 to 20, respectively), LiCl, LiI or a mixture thereof may be used.

Figure 3:
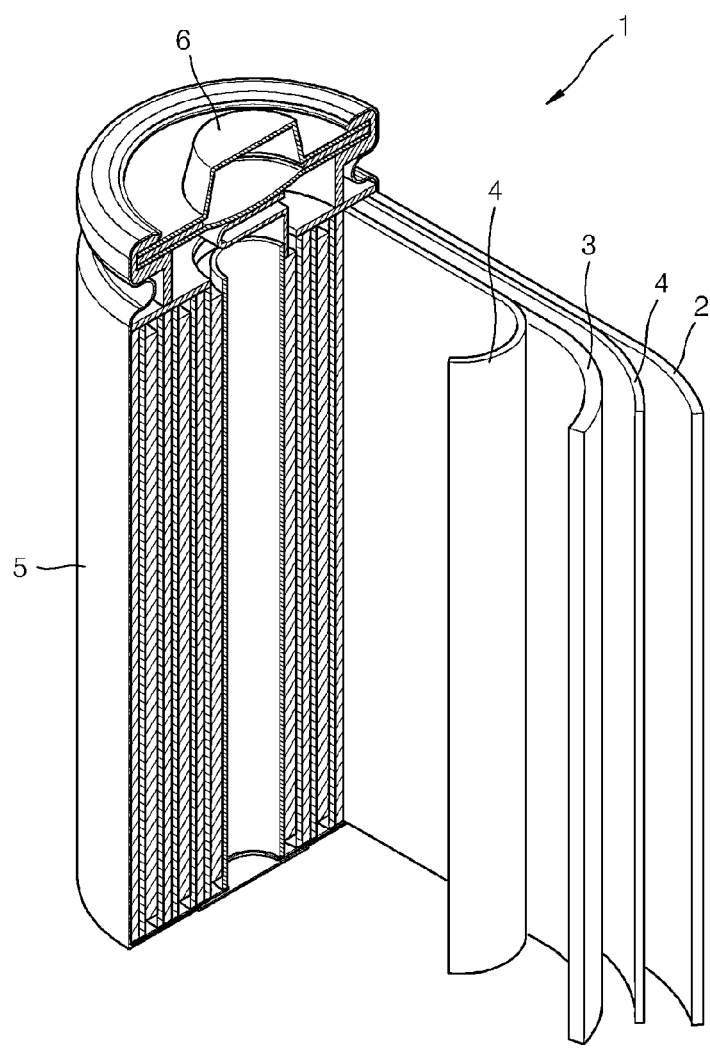
FIG. 3 is a schematic view of a lithium battery according to an embodiment.

Referring to FIG. 3, a lithium battery 1 includes a positive electrode 3, a negative electrode 2, and a separator 4. In certain embodiments, the positive electrode 3, the negative electrode 2, and the separator 4 may be wound or folded to be placed in a battery case 5. In certain embodiments, an organic electrolytic solution may be injected into the battery case 5, thereby sealing a cap assembly 6, thereby completing the manufacture of the lithium battery 1. In certain embodiments, the battery case may be cylindrical, rectangular, thin film-shaped, and the like. In certain embodiments, the lithium battery may be a thin film-shaped battery. In certain embodiments, the lithium battery may be a lithium ion battery.

In certain embodiments, the separator may be interposed between the positive electrode and the negative electrode to form a battery assembly. In certain embodiments, a plurality of battery assemblies may be stacked in a bi-cell structure and then impregnated with an organic electrolytic solution, and the obtained result may be housed in a pouch, followed by sealing, thereby completing the manufacture of a lithium ion polymer battery.

In certain embodiments, a plurality of the battery assemblies may be stacked to form a battery pack, and the battery pack may be used in various devices that require high capacitance and high power output. For example, the battery assemblies may be used in a notebook computer, a smartphone, an electric vehicle, or the like.

In certain embodiments, the lithium battery may be suitable for use in an electric vehicle (EV), for example, a hybrid car, such as a plug-in hybrid electric vehicle (PHEV) due to its excellent high-rate characteristics and lifespan characteristics.

In certain embodiments, the composite binder for a battery may be prepared by mixing a binder polymer emulsion, an organic-inorganic coupling agent, and inorganic particle colloid.

In certain embodiments, a colloidal-phase inorganic particle may be added to a binder polymer emulsion, and then, an organic-inorganic coupling agent may be added thereto, so that the colloidal-phase inorganic particle permeates into the binder polymer particle dispersed in the emulsion by, for example, diffusion. Subsequently, the organic-inorganic coupling agent may bind to the inorganic particle and the binder polymer by hydrolysis, thereby completing the preparation of the composite binder. A solvent included in the composition binder may be water, but is not limited thereto, and any one of various solvents that enable the formation of a hydrogen bond may be used herein.

In certain embodiments, the binder composition may be, in general, prepared in a solution phase. However, once the solvent is removed, the binder composition may be present inside an electrode in the form of a mixture including the binder polymer, the hydrolysis product of the organic-inorganic coupling agent, and the inorganic particle.

Regarding a mixed ratio of the binder polymer emulsion, the organic-inorganic coupling agent, and the inorganic particle colloid in the composition, based on 100 parts by weight of a dry content of the binder polymer emulsion, an amount of a dry content of the inorganic particle colloid may be in a range of about 1 to about 30 parts by weight and an amount of the organic-inorganic coupling agent may be in a range of about 0.01 to about 5 parts by weight. In certain embodiments, an amount of a dry content of the inorganic particle colloid may be in a range of about 3 to about 15 parts by weight and an amount of the organic-inorganic coupling agent may be in a range of about 0.01 to about 5 parts by weight based on 100 parts by weight of a dry content of the binder polymer emulsion.

Hereinafter, exemplary embodiments of the present embodiments are described in detail with reference Examples. However the present embodiments are not limited to the Examples.

Preparation of First Polymer Emulsion

Preparation Example 1

A flask equipped with a condenser, a thermometer, an inlet tube for a monomer emulsifying solution, a nitrogen gas inlet tube, and an agitator was placed under with nitrogen, and then, 60 parts by weight of distilled water and 1.5 parts by weigh of dodecylbenzenesulfonic acid sodium salt were added to the flask and then the temperature was increased to 80° C. Then, 2 parts by weight of styrene was added to the flask, followed by 5 minutes of stifling, and then, 10 parts by weight of ammonium peroxysulfate 5% aqueous solution was added to the reactor to initiate an reaction. One hour later, a monomer emulsified solution including 30 parts by weight of 2-ethylhexylacrylate, 68 parts by weight of styrene, 2 parts by weight of an acrylic acid, 0.5 parts by weight of a dodecyl benzene sulfonic acid sodium salt, and 40 parts by weight of distilled water was added to the flask by dropwise addition over a 3 hour period of time. Simultaneously, 6 parts by weight of ammonium peroxysulfate 5% aqueous solution was added to the flask by dropwise addition over a 3 hour period of time. After adding the monomer emulsified solution into the flask, the process was continued for 2 hours, and then the temperature was decreased to 20° C., followed by exposure to reduced pressure to remove the residual monomer to obtain a polymer emulsion. The particle diameter of polymer particles dispersed in the emulsion was in a range of 100 to 200 nm.

Preparation Example 2

An 10 L autoclave reactor was placed under nitrogen, and then, 60 parts by weight of distilled water and 1.5 parts by weight of dodecylbenzenesulfonic acid sodium salt were added thereto and the temperature was increased to 70° C. Then, 2 parts by weight of styrene was added to the reactor, followed by 5 minutes of stirring, and then, 10 parts by weight of ammonium peroxysulfate 2% aqueous solution was added to the reactor to initiate an reaction. One hour later, a monomer emulsified solution including 40 parts by weight of butadiene, 46 parts by weight of styrene, 10 parts by weight of methylmethacrylate, 3 parts by weight of itaconic acid, 1 part by weight of hydroxyethylacrylate, 0.5 parts by weight of dodecylbenzenesulfonic acid sodium salt, and 40 parts by weight of distilled water was added to the reactor by dropwise addition over a 4 hour period of time. Simultaneously, 10 parts by weight of potassium persulfate 2% aqueous solution was added thereto by dropwise addition over a 3 hour period of time. After dropping of the monomer emulsified solution into the reactor, the process was continued for 3 hours, and then the temperature was decreased to 20° C., followed by exposure to reduced pressure to remove the residual monomer to obtain a polymer emulsion.

Preparation of Composite Binder

Example 1

A pH of a colloidal silica (a solid content of 20 wt %), 5 parts by weight based on a dry content, having an average particle diameter of 50 nm was adjusted to be 8 with lithium hydroxide, and then the pH adjusted colloidal silica was added to the polymer emulsion (40 wt % of solid content), 100 parts by weight based on a dry content, prepared according to Preparation Example 1, followed by 10 minutes of stifling. Then, 0.2 parts by weight of the organic-inorganic coupling agent γ-glycydoxypropyltrimethoxysilane was added thereto and the mixture was stirred for 20 minutes to complete the preparation of the composite binder composition.

Example 2

A composite binder composition was prepared in the same manner as in Example 1, except that the polymer emulsion prepared according to Preparation Example 2 was used.

Example 3

A composite binder composition was prepared in the same manner as in Example 1, except that a colloidal alumina (a solid content of 20 wt %) having an average particle diameter of 50 nm was used instead of a colloidal silica (a solid content of 20 wt %) having an average particle diameter of 50 nm.

Example 4

A composite binder composition was prepared in the same manner as in Example 2, except that a colloidal alumina (a solid content of 20 wt %) having an average particle diameter of 50 nm was used instead of a colloidal silica (a solid content of 20 wt %) having an average particle diameter of 50 nm.

Comparative Example 1

The polymer emulsion prepared according to Preparation Example 1 was used as a binder.

Comparative Example 2

The polymer emulsion prepared according to Preparation Example 2 was used as a binder.

Comparative Example 3

Polyimide (20 wt %, HITACHI CHEMICAL Co., Ltd., Tokyo, Japan, HCI-1300) dissolved in an N-methylpyrrolidone (NMP) solvent was used as a binder.

Preparation of Negative Electrode and Lithium Battery

Example 5

Si—Fe alloy particles (3M, Minnesota, USA, CV3) having an average particle diameter (d50) of 3 artificial graphite (Hitachi Chemical Co. Ltd., Tokyo, Japan, MAG) and carboxy methyl celluslose (CMC) were mixed in pure water and the composite binder prepared according to Example 1 was added thereto to prepare a negative active material slurry in which a weight ratio of Si—Fe alloy particles:graphite:CMC: a composite binder (solid content) was 20:77:1:2.

The negative active material slurry was coated on a copper foil having a thickness of 10 μm to form a coating film having a thickness of 90 and then dried at a temperature of 110° C. for 0.5 hours, and pressed to make the thickness thereof to be 70 thereby completing the manufacture of a negative electrode plate. Then, a coin cell (CR2016 type) having a diameter of 32 mm was prepared.

To manufacture the cell, metal lithium was used as a counter electrode, a polyethylene separator (Star® 20, Asahi Kasei, Tokyo, Japan) having a thickness of 20 μm was used as a separator, and 1.15M $LiPF_6$ dissolved in a mixed solvent of ethylenecarbonate (EC):ethylmethylcarbonate (EMC):diethylcarbonate (DEC) (a volumetric ratio of 3:3:4) was used as an electrolyte.

Example 6

A negative electrode and a lithium battery were manufactured in the same manner as in Example 5, except that the composite binder prepared according to Example 2 was used.

Example 7

A negative electrode and a lithium battery were manufactured in the same manner as in Example 5, except that the composite binder prepared according to Example 3 was used.

Example 8

A negative electrode and a lithium battery were manufactured in the same manner as in Example 5, except that the composite binder prepared according to Example 4 was used.

Comparative Examples 4 and 5

Negative electrodes and lithium batteries were manufactured in the same manner as in Example 5, except that the binders prepared according to Comparative Examples 1 and 2 were used respectively.

Comparative Example 6

Si—Fe alloy particles (3M, Minnesota, USA, CV3) having an average particle diameter (d50) of 3 μm and artificial graphite (Hitachi Chemical Co. Ltd., Tokyo, Japan, MAG) were mixed in pure water and the binder prepared according to Comparative Example 3 was added thereto to prepare a negative active material slurry in which a weight ratio of Si—Fe alloy particles:graphite:a binder (solid content) was 18.97:73.03:8.

The active material slurry was coated on a copper foil having a thickness of 10 μm to form a coating film having a thickness of 90 μm, and then dried at a temperature of 110° C. for 0.5 hours, and pressed to make the thickness thereof to be 70 thereby completing the manufacture of a negative electrode plate. Then, a coin cell (CR2016 type) having a diameter of 32 mm was prepared.

To manufacture the cell, metal lithium was used as a counter electrode, a polyethylene separator (Star® 20) having a thickness of 20 μm was used as a separator, and 1.15M $LiPF_6$ dissolved in a mixed solvent of ethylenecarbonate (EC):ethylmethylcarbonate (EMC):diethylcarbonate (DEC) (a volumetric ratio of 3:3:4) was used as an electrolyte.

Evaluation Example 1

Tensile Test

Samples were prepared using the composite binder composition of Example 1 and the binder of Comparative Example 1. A deformation rate with respect to stress of the binder samples was measured according to an ASTM guideline by using a tensile tester manufactured by Instron Company, and FIG. 2 is a stress-strain linear diagram depicted from the results.

Figure 2:
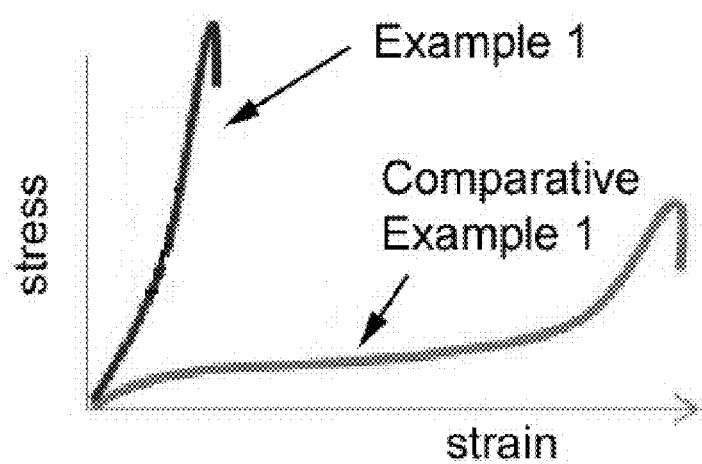
FIG. 2 shows tensile strength results of the composite binder prepared according to Example 1 and the binder prepared according to Comparative Example 1.

Referring to FIG. 2, a tensile strength of the composite binder of Example 1 was substantially improved compared to that of the binder of Comparative Example 1.

Evaluation Example 2

Charging and Discharging Evaluation

The coin cells manufactured according to Examples 5 through 8 and Comparative Examples 4 through 6 were charged with 0.2 C rate of a constant current at a temperature of 25° C. until a voltage reached 0.01V (vs. Li), and then while the voltage of 0.01V was maintained, the coin cells were charged at a constant voltage until the current reached 0.01 C rate. Subsequently, discharging was performed with 0.2 C rate of a constant current until the voltage reached 1.5V (vs. Li) (formation process).

The lithium batteries that underwent the formation process were charged with 0.5 C rate of a constant current at a temperature of 25° C. until the voltage reached 0.01V (vs. Li), and then while maintaining the voltage at 0.01V, charging was performed at a constant voltage until the current reached 0.01 C rate. Then, discharging was performed with a 0.5 C rate of a constant current until the voltage reached 1.5V (vs. Li). This charging and discharging cycle was repeatedly performed 30 times.

Some of the charging and discharging test results are shown in Table 1 below. A charging and discharging efficiency at formation process and a capacity maintenance rate are defined as Equations 1 and 2 below. Performance of the lithium batteries was qualitatively evaluated.

Charging and discharging efficiency at formation process=[discharge capacitance at formation process/charging capacitance at formation process]×100   Equation 1

Capacitance retention ratio=[discharge capacitance in $30^{th}$ cycle/discharge capacitance in $1^{st}$]×100   Equation 2

TABLE 1

|  | Information process charging and discharging efficiency | In $30^{th}$ cycle Capacitance retention ratio |
|---|---|---|
| Example 7 | 91.3 | 90.1 |
| Example 8 | 91.8 | 89.9 |
| Comparative Example 4 | 92.5 | 84.7 |
| Comparative Example 5 | 92.4 | 84.8 |
| Comparative Example 6 | 72.9 | 95.7 |

As shown in Table 1, the lithium batteries of Examples 7 and 8 had similar initial efficiency and improved lifespan characteristics than the lithium batteries of Comparative Examples 4 and 5. Also, the lithium battery of Comparative Example 6 had improved lifespan characteristics due to the use of the high-hardness polyimide binder. However, it also had very low initial efficiency due to low ionic conductivity. Thus, the lithium battery comprising the composite binder of the present application can provide a good initial efficiency and lifespan characteristics at the same time.

In certain embodiments, a formed lithium battery may have improved cyclic characteristics due to the inclusion of a composite binder including an inorganic particle, a binder polymer, and an organic-inorganic coupling agent.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from the spirit and scope of the present embodiments as defined by the following claims.

What is claimed is:

1. A composite binder for an electrode comprising:
an inorganic particle;
a binder polymer; and
an organic-inorganic coupling agent,
wherein the inorganic particle is dispersed in the binder polymer in a colloidal-phase with a pH of about 8 to about 11, and the organic-inorganic coupling agent is bonded on at least a portion of the inorganic particle to couple the inorganic particle to the binder polymer.

2. The composite binder of claim 1, wherein the inorganic particle is a hydrophilic particle.

3. The composite binder of claim 1, wherein the inorganic particle is in an amorphous phase.

4. The composite binder of claim 1, wherein an average particle diameter of the inorganic particle is in a range of about 1 nm to about 1000 nm.

5. The composite binder of claim 1, wherein the inorganic particle comprises at least one component selected from the group consisting of a metal oxide and a metalloidal oxide.

6. The composite binder of claim 1, wherein the inorganic particle comprises at least one component selected from the group consisting of silica, alumina, titanium oxide, magnesium fluoride, and zirconium oxide.

7. The composite binder of claim 1, wherein the organic-inorganic coupling agent is a silane-based compound.

8. The composite binder of claim 1, wherein the organic-inorganic coupling agent is a hydrolysis product of a silane coupling agent.

9. The composite binder of claim 8, wherein the silane coupling agent comprises at least one moiety selected from the group consisting of an alkoxy group, a halogen group, an amino group, a vinyl group, a glycidoxy group, and a hydroxyl group.

10. The composite binder of claim 8, wherein the silane coupling agent comprises at least one component selected from the group consisting of vinylalkylalkoxysilane, epoxyalkylalkoxysilane, mercaptoalkylalkoxysilane, vinylhalosilane, and alkylacyloxysilane.

11. The composite binder of claim 1, wherein a glass transition temperature of the binder polymer is in a range of about −50° C. to about 60° C.

12. The composite binder of claim 1, wherein the binder polymer comprises at least one moiety selected from the group consisting of a carboxy group and a hydroxy group.

13. The composite binder of claim 1, wherein the binder polymer comprises at least one component selected from the group consisting of styrene-butadiene rubber, acrylated styrene-butadiene rubber, acrylonitrile-butadiene rubber, acrylonitrile-butadiene-styrene rubber, acryl rubber, butyl rubber, fluorinated rubber, polytetrafluoroethylene, polyethylene, polypropylene, an ethylenepropylene copolymer, a polyethyleneoxide, polyvinylpyrrolidone, polyepichlorohydrine, polyphosphazene, polyacrylate, polyacrylonitrile, polystylene, an ethylenepropylenediene copolymer, polyvinylpyridine, chlorosulfonated polyethylene, latex, a polyester resin, an acryl resin, a phenol resin, an epoxy resin, polyvinylalchohol, carboxymethyl cellulose, hydroxypropylmethyl cellulose, hydroxy propylcellulose, and diacetyl cellulose.

14. A negative electrode comprising:
a negative active material; and
the composite binder of claim 1.

15. The negative electrode of claim 14, wherein the negative active material is a non-carbonaceous material.

16. The negative electrode of claim 14, wherein the negative active material comprises at least one component selected from the group consisting of a metal that is alloyable with lithium, an alloy of a metal that is alloyable with lithium, and an oxide of a metal that is alloyable with lithium.

17. The negative electrode of claim 14, wherein the negative active material comprises at least one component selected from the group consisting of Si, Sn, Pb, Ge, Al, $SiO_x$ ($0<x\leq SnO_y$, ($0<y\leq 2$), $Li_4Ti_5O_{12}$, $TiO_2$, $LiTiO_3$, and $Li_2Ti_3O_7$.

18. A lithium battery including the negative electrode of claim 14; and a positive electrode.

* * * * *